Oct. 29, 1935.  J. P. CROWLEY ET AL  2,019,175
SHEET GLASS CUTTING APPARATUS
Filed Oct. 12, 1932  2 Sheets-Sheet 1
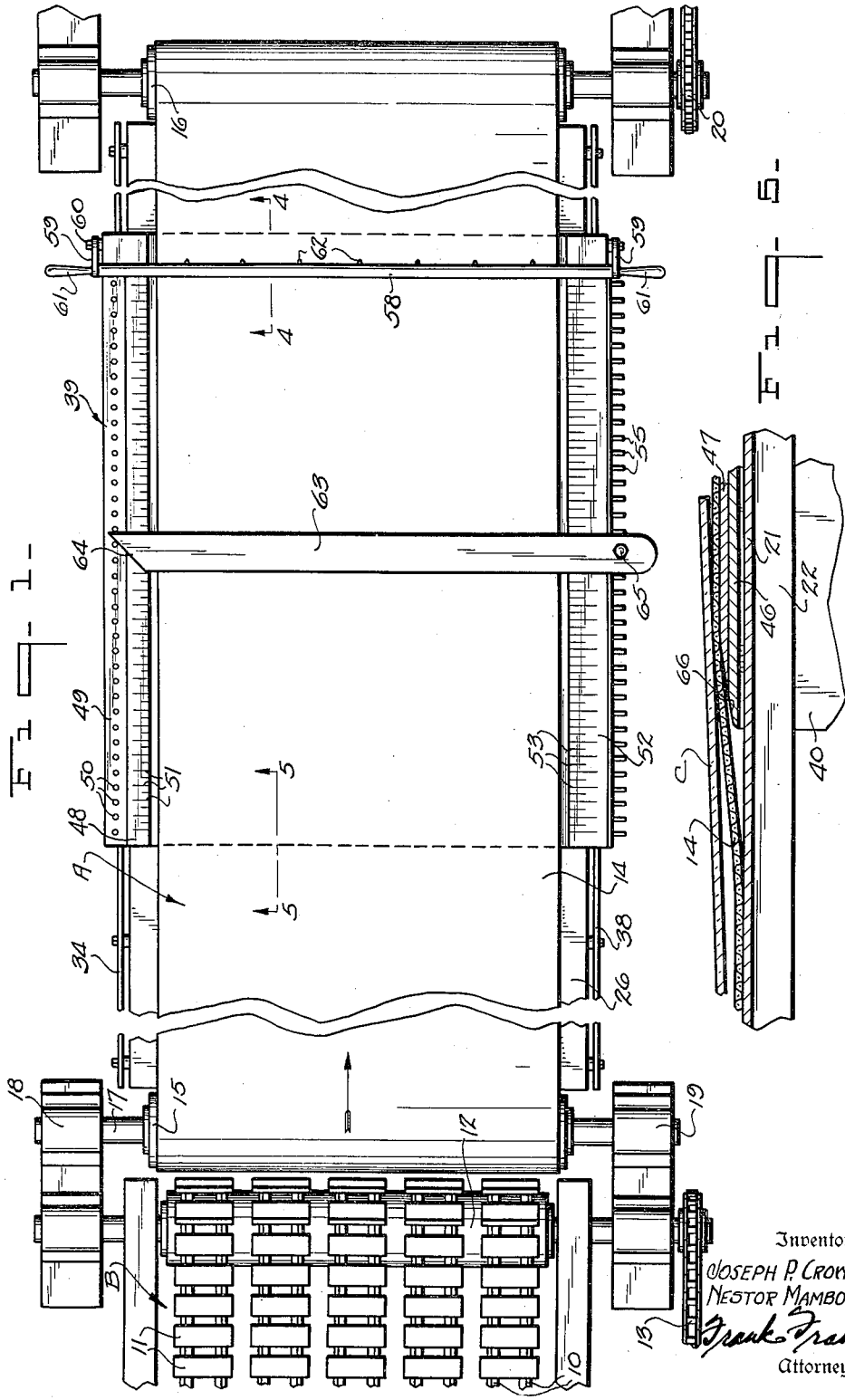
Inventor
JOSEPH P. CROWLEY
NESTOR MAMBOURG
Frank Fraser
Attorney Oct. 29, 1935.    J. P. CROWLEY ET AL    2,019,175
SHEET GLASS CUTTING APPARATUS
Filed Oct. 12, 1932    2 Sheets-Sheet 2
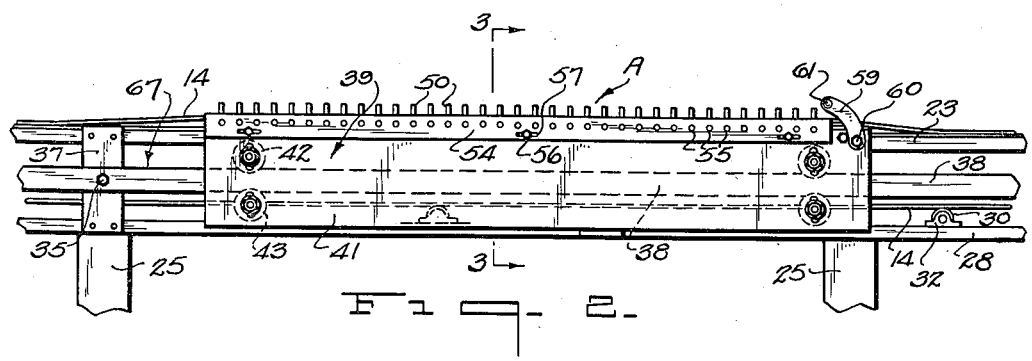
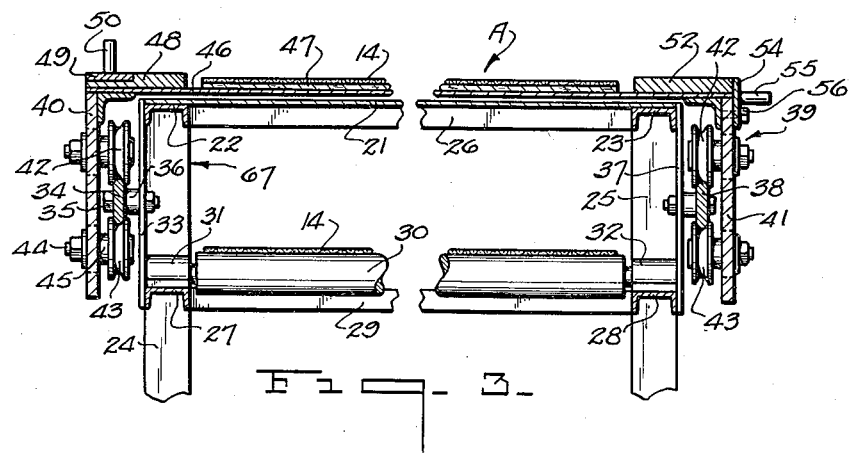
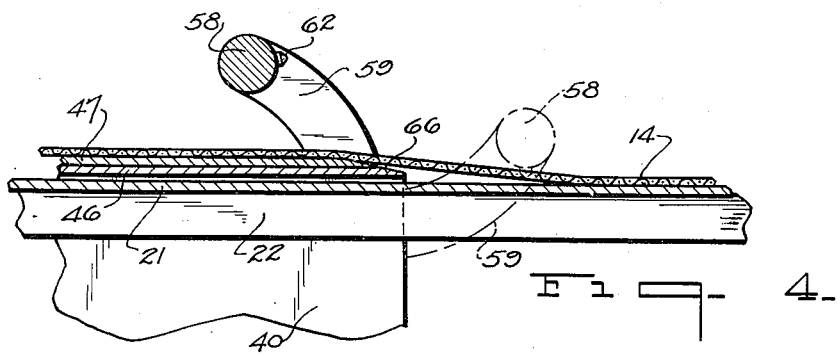
Inventor
JOSEPH P. CROWLEY.
NESTOR MAMBOURG.
By Frank Fraser
Attorney Patented Oct. 29, 1935

2,019,175

UNITED STATES PATENT OFFICE 2,019,175

SHEET GLASS CUTTING APPARATUS

Joseph P. Crowley, Toledo, and Nestor Mambourg, Lancaster, Ohio, assignors to Libbey-Owens-Ford Glass Company, Toledo, Ohio, a corporation of Ohio Application October 12, 1932, Serial No. 637,478

16 Claims. (Cl. 33—32)

The present invention relates to an improved form of glass cutting apparatus upon which sheets of glass may be properly squared and cut.

In the production of sheet glass according to certain well known processes, the continuous sheet or ribbon of glass, after being formed, is carried horizontally through an annealing leer and emerges therefrom onto a traveling capping or cutting table upon which the continuous sheet or ribbon is cut transversely into individual sheets of glass of the desired length, and the opposite side edges of said sheets suitably trimmed off. The individual sheets of glass are then removed from the cutting table and carried into an inspection and cutting room wherein the sheets are first inspected and then cut up into a plurality of smaller lights of glass.

The principal aim and object of this invention resides in the provision of novel glass cutting apparatus for greatly facilitating and expediting the cutting up of the individual sheets of glass into smaller sizes, and in such a manner as to speed up production, lessen the amount of labor involved and reduce handling of the glass to a minimum.

Another important object of the invention is the provision of a novel form of glass cutting apparatus so constructed that the glass sheets can be cut up into a plurality of smaller sizes while being carried continuously forwardly thereby in a generally horizontal direction.

A further object of the invention is the provision of glass cutting apparatus of the above character which may be positioned to receive the individual sheets of glass from the capping table and carry them continuously forwardly, said apparatus including means whereby the said sheets may be cut into a plurality of smaller lights of glass during the forward travel thereof so as not to in any way interfere with the continuous formation of the glass sheet.

Other objects and advantages of the invention will become more apparent during the course of the following description when taken in connection with the accompanying drawings.

In the drawings forming a part of this application and wherein like numerals are employed to designate like parts throughout the same, Fig. 1 is a plan view of cutting apparatus constructed in accordance with the present invention, Fig. 2 is a side elevation of a portion thereof, Fig. 3 is a section taken substantially on line 3—3 of Fig. 2, Fig. 4 is a section taken substantially on line 4—4 of Fig. 1, and Fig. 5 is a section taken substantially on line 5—5 of Fig. 1.

Referring now to the drawings, the improved cutting apparatus forming the subject matter of the present invention is designated in its entirety by the letter A, and although it is to be expressly understood that this cutting apparatus is not limited to use in connection with any particular type of sheet glass forming and/or handling mechanism, it has been herein illustrated by way of example as being positioned relatively closely adjacent the outer end of a capping or cutting table B for receiving the glass sheets therefrom.

The capping table B may take a variety of forms but is here shown as comprising a plurality of spaced parallel endless chains 10 carrying a series of wooden blocks 11 which form, in the upper run of the chains, a flat even supporting table for the glass as it emerges thereupon from the annealing leer (not shown). The glass sheet may emerge from the leer in the form of a continuous or substantially continuous ribbon which is then adapted to be cut transversely upon the capping table to provide individual sheets of the desired size. The transverse scoring of the glass may be accomplished either by the use of a conventional hand scoring tool or by suitable scoring mechanism. The endless chains 10 are trained at each end about a roller or drum 12, one of which may be positively driven in any desired manner such as by means of a chain and sprocket drive 13 to move the upper run of the table in a direction to advance the glass sheets forwardly.

The glass cutting apparatus A comprises an endless horizontal belt 14, preferably of canvas or some other suitable material, said belt being trained at its opposite ends about the horizontal rolls or drums 15 and 16 respectively, each drum being carried upon a shaft 17 mounted at its opposite ends in bearings 18 and 19. One of the said drums, and as here shown drum 16, may be positively driven in any desired manner to drive the endless belt 14, such as by means of a sprocket and chain drive 20, the sprocket chain being trained about a sprocket keyed to the roll shaft.

Arranged beneath the upper horizontal run of the endless belt 14 between the drums 15 and 16 is a supporting framework or table designated in its entirely by the numeral 67 and comprising a substantially solid horizontal top 21 which extends approximately the entire length of the belt and over which the upper horizontal run or flight thereof is adapted to slide while being supported thereby. This supporting top plate 21 is carried at opposite sides thereof by the longitudinally extending channel beams 22 and 23 respectively supported at opposite ends and also intermediate their ends by the vertical legs 24 and 25. Suitable bracing cross members 26 may extend between and connect the longitudinal beams 22 and 23 at suitably spaced intervals throughout the length thereof.

Positioned beneath the longitudinally extending beams 22 and 23 in spaced relation thereto are the longitudinally extending beams 27 and 28 respectively also carried by the legs 24 and 25 and being connected together by suitable cross members 29. Arranged beneath the top 21 of the framework 67 are a plurality of spaced transverse rollers 30 rotatably mounted at their opposite ends in bearings 31 and 32 carried by the longitudinal beams 27 and 28 respectively, said rollers being adapted to support the lower horizontal run or flight of the endless belt 14.

Extending between and fastened to the upper and lower longitudinal beams 22 and 27 are a plurality of spaced plates 33 while extending longitudinally of the table and carried by these plates is a horizontal guide rail or track 34, said rail being secured to said plates by bolts 35 and maintained in properly spaced relation with respect thereto by the spacing collars 36 encircling said bolts between the rail and plates 33. Extending between and carried by the longitudinal beams 23 and 28 at the opposite side of the table are a plurality of similar plates 37 carrying, in a similar manner, the longitudinally extending horizontal rail 38 disposed opposite to and running parallel with rail 34.

Mounted for longitudinal movement upon the rails 34 and 38 is a cutting table or carriage designated in its entirety by the numeral 39. This table comprises the vertical side plates 40 and 41 respectively arranged at opposite sides of the supporting framework 67 outwardly thereof, each of said side plates carrying adjacent each end thereof a pair of vertically spaced grooved wheels 42 and 43 engaging the upper and lower edges respectively of the corresponding rail 34 or 38. Each roller 42 and 43 is freely mounted for rotation upon a transverse pin 44 passing through the respective side plate 40 or 41, and is maintained suitably spaced from said side plate by a spacing collar 45. The vertical side plates 40 and 41 project upwardly to a point slightly above the top 21 of the supporting framework 67, and carried upon the upper edges of the said side plates is a horizontal plate 46 constituting the top of the cutting table. Secured upon the top plate 46 is a relatively narrower auxiliary plate 47. It will be noted that the plates 46 and 47 are arranged beneath the upper horizontal run or flight of the endless belt 14, and that the plate 46 is also spaced slightly above the plate 21 of supporting framework 67 so as not to contact therewith.

Carried by the top 46 of the cutting table 35 adjacent the rear longitudinal edge thereof, as viewed in Fig. 1, is a longitudinally extending wooden strip 48, being cut or notched out to receive a wooden strip 49 carrying a series of spaced vertically projecting pins 50. The upper surface of the strip 48 is preferably graduated as shown at 51 in Fig. 1 to correspond with the spacing of the pins 50. Resting upon the top 46 of the cutting table along the forward edge thereof is a longitudinally extending strip 52 also suitably graduated as indicated at 53 in Fig. 1 to correspond to the graduations 51 on strip 48. The strip 52 has secured to the front edge thereof a vertical strip 54 carrying a series of forwardly directed horizontal pins 55 which are adapted to be arranged in alignment with the vertical pins 50. The strip 54 may be adjustably secured to the vertical side plate 41 of the cutting table 39 by a plurality of fastening elements 56 passing through horizontal slots 57 in the said strip 54. Due to the provision of the slots 57, the strip 54 may be moved longitudinally of the cutting table within certain limits to bring and maintain the pins 55 carried thereby in proper alignment with the pins 50.

From the above, it will be readily apparent that the cutting table or carriage 39 is freely movable longitudinally upon the rails 34 and 38 and may be moved in either direction relative to the conveyor belt 14 and irrespective of the movement of the said belt thereover. However, during the cutting of the glass sheets upon the cutting table 39, it is desirable that the said table be caused to move with the belt 14 and at the same speed. To this end there may be provided a gripping bar 58 extending transversely above the belt 14 and being carried at each end by an arm 59 pivoted to the respective side plate 40 or 41 of the cutting table 39 as at 60. Carried by each arm 59 is a handle 61 by means of which the bar 58 may be moved out of engagement with the upper horizontal run of the endless belt 14 as shown by the full lines in Fig. 4, or into gripping engagement therewith as indicated by the broken lines in the same figure. The gripping bar 58 may also be provided if desired with a plurality of spaced prongs or fingers 62 so as to obtain a firmer grip upon the conveyor belt 14.

In the squaring and cutting of glass sheets in accordance with the present invention, the endless conveyor belt 14 is first placed in operation in a manner to cause the upper horizontal run thereof to be driven in the direction indicated by the arrow in Fig. 1 which is the same direction in which the capping table B is adapted to be simultaneously travelling. As a consequence, the individual sheets of glass will be delivered from the capping table B onto conveyor belt 14 and carried continuously forwardly by the latter. When the glass sheet has been entirely received upon the conveyor belt, the operator grasps one of the handles 61 on gripping bar 58 and moves the cutting table 39 rearwardly or to the left in Fig. 1 along the rails 34 and 38 so as to cause the top 46 of the table to slide beneath the glass sheet. This is best shown in Fig. 5 wherein the glass sheet is designated C. In other words, due to the fact that the top of the cutting table 39 is arranged beneath the upper run of the conveyor belt 14 and also inasmuch as this run of the belt is moving in a direction to carry the glass sheet forwardly, the said sheet C, upon rearward movement of the cutting table, will be caused to ride up onto the top thereof. When the glass sheet C is entirely received upon the cutting table 39, the operator moves the handle 61 in the opposite direction and the rod 58 into gripping engagement with the conveyor belt and, when this is done, it will be readily seen that the cutting table will be carried along by the conveyor in the same direction and at the same speed. That is to say, the cutting table and conveyor belt will be locked together so that they will move as a unit. During the forward movement of the cutting table and belt, the operator, stationed at the front of said table, is adapted to square up and cut the glass sheet into a plurality of relatively smaller sizes in a manner well known in the art. More specifically, the longitudinally extending strip 52 carried at the forward edge of the cutting table is adapted to constitute a straight edge against which the glass sheet may be squared preparatory to cutting. As shown in Fig. 3 of the drawings, the strip 52 projects slightly above the upper surface of the endless belt 14 so that the forward edge of the glass sheet can be moved to abut the inner edge of said strip. If desired, the upper surface of the strip 52 may be disposed on a level with the upper surface of the endless belt so that the glass sheet can rest thereupon and the forward edge of the said sheet brought into alignment by the operator with the outer edge of the said strip preparatory to cutting. In either event, however, it will be clear that the strip 52 forms, in effect, a straight edge against which the glass sheet may be squared.

In cutting the glass sheet, while upon the cutting table, into a plurality of relatively smaller lights of glass, the operator will make use of a customary straight edge 63 which serves as a cutter guide and which is adapted to rest upon the glass sheet during the squaring and cutting thereof. The rear end edge of the straight edge 63 is preferably bevelled as at 64 and is adapted to be received between the upstanding pins 50, while carried at the forward end thereof is a vertical pin 65 passing therethrough and adapted to be received between the forwardly directed pins 55 so that the straight edge may be properly maintained in the desired position during the cutting operation. The scoring of the glass sheet may be accomplished by simply drawing a hand cutting tool of any well known type over the glass and in contact therewith, the said cutter being guided along by the straight edge 63. It will of course be readily understood that the conveyor belt and cutting table are moved forwardly as a unit at a relatively slow speed and which is sufficiently slow to permit of the cutting of the glass by the operator during such movement.

After the cutting of the glass sheet has been completed, the operator again lifts the gripping bar 58 out of engagement with the conveyor belt, whereupon the glass will be carried forwardly by the belt off of the cutting table while the said table remains stationary. The operator can then again move the cutting table rearwardly beneath another sheet of glass received upon the forward end of the conveyor belt from the capping table, and the same cycle of operations above described repeated. In order to facilitate the sliding of the top of the cutting table, upon rearward movement thereof, beneath the forwardly moving sheet of glass upon the conveyor belt, and also to facilitate the movement of the glass from said table after cutting, the top plate 46 and auxiliary plate 47 of the cutting table are preferably bevelled at each end as indicated at 66 in Figs. 4 and 5. As pointed out above, it is to be fully understood that the improved cutting apparatus herein provided is not limited to use in connection with the capping table B or in connection with any particular type of sheet glass forming and/or handling mechanism.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

We claim:

1. In sheet glass cutting apparatus of the character described, a horizontally disposed endless conveyor, means for driving said conveyor, a cutting table including a horizontal top plate positioned beneath the upper horizontal run of said conveyor, said cutting table being movable longitudinally of the conveyor independently thereof, means for causing the cutting table and endless conveyor to move as a unit, means carried at one edge of the top plate and forming a straight edge against which the glass sheet may be squared preparatory to cutting, and a straight edge for a hand scoring tool removably associated with the cutting table.

2. In sheet glass cutting apparatus of the character described, a horizontally disposed endless conveyor, means for driving said conveyor, a cutting table including a horizontal top plate positioned beneath and over which the upper horizontal run of said conveyor slides, said cutting table being movable longitudinally of the conveyor independently thereof, means carried by the cutting table and engaging the conveyor for locking the said table and conveyor together so that they move as a unit, means carried at one edge of the top plate and forming a straight edge against which the glass sheet may be squared preparatory to cutting, and a straight edge for a hand scoring tool removably associated with the cutting table.

3. In sheet glass cutting apparatus of the character described, a horizontally disposed endless conveyor, means for driving said conveyor, a cutting table including a horizontal top plate positioned beneath the upper horizontal run of said conveyor, wheels carried by the cutting table, horizontal rails for supporting the table and along which the said wheels travel, said table being movable along said rails longitudinally of the conveyor and independently thereof, means for causing the cutting table and conveyor to move as a unit, means carried at one edge of the top plate and forming a straight edge against which the glass sheet may be squared preparatory to cutting, and a straight edge for a hand scoring tool removably associated with the cutting table.

4. In sheet glass cutting apparatus of the character described, a horizontally disposed endless conveyor, means for driving said conveyor, a supporting framework including a top member extending substantially the entire length of the upper run of said conveyor and adapted to support the same, a cutting table carried by said supporting framework and including a horizontal top plate positioned beneath and over which the upper horizontal run of said conveyor slides, said cutting table being movable longitudinally of the conveyor independently thereof, means for locking the cutting table to the conveyor so that they move as a unit, means carried at one edge of the top plate and forming a straight edge against which the glass sheet may be squared preparatory to cutting, and a straight edge for a hand scoring tool removably associated with the cutting table.

5. In sheet glass cutting apparatus of the character described, a horizontally disposed endless conveyor, means for driving said conveyor, a supporting framework including a top member extending substantially the entire length of the upper run of said conveyor and adapted to support the same, a cutting table including a horizontal top plate positioned between the upper horizontal run of said conveyor and the top member of said supporting framework, wheels carried by the cutting table, horizontal rails carried by the supporting framework for supporting the table and along which the said wheels travel, said table being movable along said rails longitudinally of the conveyor and independently thereof, means for causing the cutting table and conveyor to move as a unit, means carried at one edge of the top plate and forming a straight edge against which the glass sheet may be squared preparatory to cutting, and a straight edge for a hand scoring tool removably associated with the cutting table.

6. In sheet glass cutting apparatus of the character described, a horizontally disposed endless conveyor, means for driving said conveyor, a supporting framework including a top member extending substantially the entire length of the upper run of said conveyor and adapted to support the same, a cutting table including a horizontal top plate positioned between the upper horizontal run of said conveyor and the top member of said supporting framework, wheels carried by the cutting table, horizontal rails carried by the supporting framework for supporting the table and along which the said wheels travel, said table being movable along said rails longitudinally of the conveyor and independently thereof, means carried by the cutting table and engaging the conveyor for locking the said table and conveyor together so that they move as a unit, means carried at one edge of the top plate and forming a straight edge against which the glass sheet may be squared preparatory to cutting, and a straight edge for a hand scoring tool removably associated with the cutting table.

7. In combination in sheet glass cutting apparatus of the character described, a horizontally disposed endless conveyor, means for driving said conveyor, a cutting table including a horizontal top plate positioned beneath the upper horizontal run of said conveyor, means carried at one edge of the top plate and forming a straight edge against which the glass sheet may be squared preparatory to cutting, spaced upstanding pins carried by said table adjacent the rear edge thereof and to one side of the conveyor, spaced forwardly directed pins arranged along the front edge of the table at the opposite side of said conveyor, a straight edge for a hand scoring tool removably associated with the cutting table and adapted to rest upon the glass sheet during the cutting thereof, said straight edge being maintained in position by the said upstanding and forwardly directed pins, the cutting table being movable longitudinally of the conveyor independently thereof, and means for causing the cutting table and endless conveyor to move as a unit.

8. In combination in sheet glass cutting apparatus of the character described, a horizontally disposed endless conveyor, means for driving said conveyor, a cutting table including a horizontal top plate positioned beneath the upper horizontal run of said conveyor, means carried at one edge of the top plate and forming a straight edge against which the glass sheet may be squared preparatory to cutting, spaced upstanding pins carried by said table adjacent the rear edge thereof and to one side of the conveyor, spaced forwardly directed pins arranged along the front edge of the table at the opposite side of said conveyor, a straight edge for a hand scoring tool removably associated with the cutting table and adapted to rest upon the glass sheet during the cutting thereof, said straight edge being maintained in position by the said upstanding and forwardly directed pins, the cutting table being movable longitudinally of the conveyor independently thereof, and means carried by the cutting table and engaging the conveyor for locking the said table and conveyor together so that they move as a unit.

9. In combination in sheet glass cutting apparatus of the character described, a horizontally disposed endless conveyor, means for driving said conveyor, a cutting table including a horizontal top plate positioned beneath the upper horizontal run of said conveyor, means carried at one edge of the top plate and forming a straight edge against which the glass sheet may be squared preparatory to cutting, spaced upstanding pins carried by said table adjacent the rear edge thereof and to one side of the conveyor, spaced forwardly directed pins arranged along the front edge of the table at the opposite side of said conveyor, a straight edge for a hand scoring tool removably associated with the cutting table and adapted to rest upon the glass sheet during the cutting thereof, said straight edge being maintained in position by the said upstanding and forwardly directed pins, wheels carried by the cutting table, horizontal rails for supporting the table and along which the said wheels travel, said table being movable along said rails longitudinally of the conveyor independently thereof, and means for locking the cutting table to the conveyor so that they move as a unit.

10. In combination in sheet glass cutting apparatus of the character described, a horizontally disposed endless conveyor, means for driving said conveyor, a supporting framework including a top member extending substantially the entire length of the upper run of the conveyor and adapted to support the same, a cutting table carried by said supporting framework and including a horizontal top plate positioned beneath and over which the upper horizontal run of said conveyor slides, means carried at one edge of the top plate and forming a straight edge against which the glass sheet may be squared preparatory to cutting, spaced upstanding pins carried by said cutting table adjacent the rear edge thereof and to one side of the conveyor, spaced forwardly directed pins arranged along the front edge of the table at the opposite side of said conveyor, a straight edge for a hand scoring tool removably associated with the cutting table and adapted to rest upon the glass sheet during the cutting thereof, said straight edge being maintained in position by the said upstanding and forwardly directed pins, the cutting table being movable longitudinally of the conveyor independently thereof, and means for locking the cutting table to the conveyor so that they move as a unit.

11. In combination in sheet glass cutting apparatus of the character described, a horizontally disposed endless conveyor, means for driving said conveyor, a supporting framework including a top member extending substantially the entire length of the upper run of the conveyor and adapted to support the same, a cutting table including a horizontal top plate positioned between the upper horizontal run of said conveyor and the top member of said supporting framework, means carried at one edge of the top plate and forming a straight edge against which the glass sheet may be squared preparatory to cutting, spaced upstanding pins carried by said table adjacent the rear edge thereof and to one side of the conveyor, spaced forwardly directed pins arranged along the front edge of the table and at the opposite side of said conveyor, a straight edge for a hand scoring tool removably associated with the cutting table and adapted to rest upon the glass sheet during the cutting thereof, said straight edge being maintained in position by the said upstanding and forwardly directed pins, wheels carried by the cutting table, horizontal rails carried by the supporting framework for supporting the table and along which the said wheels travel, said table being movable along said rails longitudinally of the conveyor independently thereof, and means carried by the cutting table and engaging the conveyor for locking the said table and conveyor together so that they move as a unit.

12. In sheet glass cutting apparatus, the combination with a capping table for receiving thereupon a continuous ribbon of glass from an annealing leer and upon which the said ribbon is cut transversely into individual sheets, of a horizontally disposed endless conveyor positioned to receive the individual sheets from the capping table, means for driving said conveyor, a cutting table including horizontal top plate positioned beneath the upper horizontal run of said conveyor, said cutting table being movable longitudinally of the conveyor independently thereof, means for causing the cutting table and endless conveyor to move as a unit, means carried at one edge of the top plate and forming a straight edge against which the sheets may be squared preparatory to cutting, and a straight edge for a hand scoring tool removably associated with the cutting table.

13. In sheet glass cutting apparatus, the combination with a capping table for receiving thereupon a continuous ribbon of glass from an annealing leer and upon which the said ribbon is cut transversely into individual sheets, of a horizontally disposed endless conveyor positioned to receive the individual sheets from the capping table, means for driving said conveyor, a cutting table including a horizontal top plate positioned beneath the upper horizontal run of said conveyor, means carried at one edge of the top plate and forming a straight edge against which the sheets may be squared preparatory to cutting, spaced upstanding pins carried by said table adjacent the rear edge thereof and to one side of the conveyor, spaced forwardly directed pins arranged along the front edge of the table at the opposite side of said conveyor, a straight edge for a hand scoring tool removably associated with the cutting table and adapted to rest upon the sheet during the cutting thereof, said straight edge being maintained in position by the said upstanding and forwardly directed pins, the cutting table being movable longitudinally of the conveyor independently thereof, and means for causing the cutting table and endless conveyor to move as a unit.

14. In the art of cutting sheet glass, the method which consists in advancing a continuous ribbon of glass in a generally horizontal direction, in cutting the continuous ribbon during the forward movement thereof transversely into individual sheets, and in squaring up and cutting the individual sheet into a plurality of sections of predetermined accurate size without interrupting the forward travel thereof.

15. In the art of cutting sheet glass, the method which consists in passing a continuous ribbon of glass in a generally horizontal path, in cutting the continuous ribbon during the forward movement thereof transversely into individual sheets, and in squaring up and cutting the individual sheet, by a series of manual cutting operations, into a plurality of sections of predetermined accurate size without interrupting the said forward travel thereof.

16. In sheet glass cutting apparatus of the character described, a horizontally disposed endless belt, means for driving said belt, a cutting table including a horizontal top plate positioned beneath and over and in contact with which the upper horizontal run of said belt slides, said cutting table projecting at opposite sides beyond the endless belt and movable longitudinally of the said belt independently thereof, means for causing the cutting table and endless belt to move as a unit, means carried at one edge of the top plate and projecting above the endless belt to form a straight edge against which the glass sheet carried upon the belt may be squared preparatory to cutting, and a straight edge for a hand scoring tool removably associated with the cutting table.

JOSEPH P. CROWLEY.
NESTOR MAMBOURG.